US012003903B2

(12) United States Patent
Natiuk et al.

(10) Patent No.: US 12,003,903 B2
(45) Date of Patent: Jun. 4, 2024

(54) DRONE TELEMETRY SYSTEM (71) Applicant: Verizon Patent and Licensing Inc., Basking Ridge, NJ (US)

(72) Inventors: Jonathan Natiuk, Camas, WA (US); Amie Kuttruff, Portland, OR (US); Alexei Yagolnikov, Vancouver, WA (US); John Fahey, Portland, OR (US); Gregory Bauwens, Portland, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 17/369,216

(22) Filed: Jul. 7, 2021

(65) Prior Publication Data
US 2023/0008429 A1 Jan. 12, 2023

(51) Int. Cl.
*H04Q 9/00* (2006.01)
*B64C 39/02* (2023.01)
*G05D 1/00* (2006.01)
*G05D 1/10* (2006.01)
*G08G 5/00* (2006.01)

(52) U.S. Cl.
CPC ............ *H04Q 9/00* (2013.01); *B64C 39/024* (2013.01); *G05D 1/0022* (2013.01); *G05D 1/104* (2013.01); *G05D 1/1064* (2019.05); *G08G 5/0013* (2013.01); *B64U 2201/20* (2023.01); *H04Q 2209/40* (2013.01); *H04Q 2209/50* (2013.01)

(58) Field of Classification Search
CPC .......................... B64C 39/024; B64U 2201/20; G05D 1/0022; G05D 1/104; G05D 1/1064; G06F 21/44; G08G 5/0013; G08G 5/0026; G08G 5/0043; G08G 5/0069; H04L 63/0807; H04Q 2209/40; H04Q 2209/50; H04Q 9/00; H04W 12/06; H04W 12/69; H04W 4/40; H04W 4/44
USPC ........................................................ 455/3.05
See application file for complete search history.

(56) References Cited

U.S. PATENT DOCUMENTS

| | | | | |
|---|---|---|---|---|
| 11,675,348 | B2* | 6/2023 | Sica | ..................... G05D 1/0011 701/2 |
| 11,679,894 | B1* | 6/2023 | Chinoy | ................. B64C 39/024 701/2 |
| 2018/0095155 | A1* | 4/2018 | Soni | ....................... G01S 19/015 |
| 2019/0031031 | A1* | 1/2019 | Oresko | ................. B60L 3/0023 |
| 2019/0161190 | A1* | 5/2019 | Gil | ........................ B65G 1/0435 |
| 2019/0369613 | A1* | 12/2019 | Moon | ..................... G01S 19/42 |
| 2019/0387458 | A1* | 12/2019 | Li | .......................... H04W 48/14 |
| 2020/0057133 | A1* | 2/2020 | Arteaga | ............... G08G 5/0069 |
| 2020/0204637 | A1* | 6/2020 | Wang | ...................... H04W 4/70 |
| 2020/0233439 | A1* | 7/2020 | Ivanov | ................. G08G 5/0034 |
| 2021/0117249 | A1* | 4/2021 | Doshi | ................. H04L 67/1001 |
| 2021/0141373 | A1* | 5/2021 | Bash | .................... G08G 5/0069 |
| 2021/0184764 | A1* | 6/2021 | Metzger | ................ H04W 72/04 |
| 2021/0327286 | A1* | 10/2021 | Stewart | ................ H04W 4/021 |
| 2021/0349458 | A1* | 11/2021 | Pu | .......................... H04W 4/40 |
| 2022/0028282 | A1* | 1/2022 | Chantz | ................ G08G 5/0052 |

(Continued)

Primary Examiner — Tan H Trinh (57) ABSTRACT

A device includes a processor. The processor is configured to execute instructions to: receive a request from an application to subscribe to a telemetry messaging service; grant a subscription to the telemetry messaging service, to the application based on the request; receive telemetry messages from drones over a radio access network (RAN); process the telemetry messages; and provide the processed telemetry messages to the application over the RAN.

20 Claims, 8 Drawing Sheets

(56) References Cited

U.S. PATENT DOCUMENTS

| | | | |
|---|---|---|---|
| 2022/0038902 A1* | 2/2022 | Mueck | G06F 21/57 |
| 2022/0051577 A1* | 2/2022 | Ali | G08G 5/0043 |
| 2022/0089181 A1* | 3/2022 | Gross | B60W 50/14 |
| 2022/0137023 A1* | 5/2022 | Chantz | G05D 1/0094 702/7 |
| 2022/0137024 A1* | 5/2022 | Chantz | G05D 1/0094 702/7 |
| 2022/0279355 A1* | 9/2022 | Roy | H04W 12/50 |
| 2022/0279414 A1* | 9/2022 | Tamura | H04W 36/32 |

* cited by examiner

```
{
    "version" : 1,
    "aircraft_UUID" : "dee8ae36-85d4-49fd-baa3-3bbc3e7c83dd",
    "altitude_m_agl" : 29.7,
    "attitude" : {
        "pitch_deg" : 2.0,
        "roll_deg" : 3.3,
        "yaw_deg" : 3.1
    },
    "battery_perc" : 77,
    "organization_UUID" : "b5b2de3d-clce-4adl-88c5-cc04f75096de",
    "pilot_UUID" : "8fae4d80-6alb-4c92-88c506981201dff523",
    "position_deg" : {
        -122.67124503850935,
        45.620360745375115
    },
    "track_deg" : 5,
    "velocity": {
        "horizontal_m_s" : 10,
        "vertical_m_s" : 10
    },
    "lastUpdated" : {
        "overall" : 1570515289
    },
    "customData" : {
        "key1" : "value",
        "key2" : 999
    }
}
```

Labels: 402 → aircraft_UUID; 404 → altitude_m_agl; 406 → attitude; 408 → battery_perc; 410 → organization_UUID; 412 → pilot_UUID; 414 → position_deg; 416 → velocity

DRONE TELEMETRY SYSTEM

BACKGROUND INFORMATION

Drones (also referred to as Uncrewed Aerial Vehicles (UAVs)) are flown remotely by a human pilot or an autonomous system. Whether drones are flown by human pilots or by autonomous systems, however, there are many challenges for deploying the drones for flight missions. For example, when a drone is to be flown by a human pilot, its flight typically needs to be planned manually by a drone operator. Once the flight is planned, the drone needs to be taken to the location from which the drone may begin its mission. The operator would then control the drone from a ground control station (GCS) or using a Radio Frequency (RF) control device. Typically, a drone operator is required to maintain a line-of-sight to the UAV throughout its flight.

DETAILED DESCRIPTION OF EXAMPLE EMBODIMENTS

The following detailed description refers to the accompanying drawings. The same reference numbers in different drawings may identify the same or similar elements.

The systems and methods described herein relate to conveying telemetry data from drones (also sometimes referred to as Uncrewed Aerial Vehicles (UAVs)) to applications that are used to control or monitor drone-related parameters. The system may be implemented in a service provider network (also referred to as "provider network") or an enterprise network coupled to the provider network. The system may receive requests from a drone and/or a user using an application to log into the system, authenticate the drone, and authenticate the user. The system may process telemetry data that the drone sends to the system and place the processed data in various queues. Each type of queue holds telemetry data with particular characteristics. These queues permit efficient transfer of telemetry data with the particular characteristics to a user, without significant additional processing, by assigning the user application to the appropriate queues. The application may access the telemetry data in the assigned queues, further process the data, and display the data via a Graphical User Interface (GUI) associated with the application.

Figure 1:
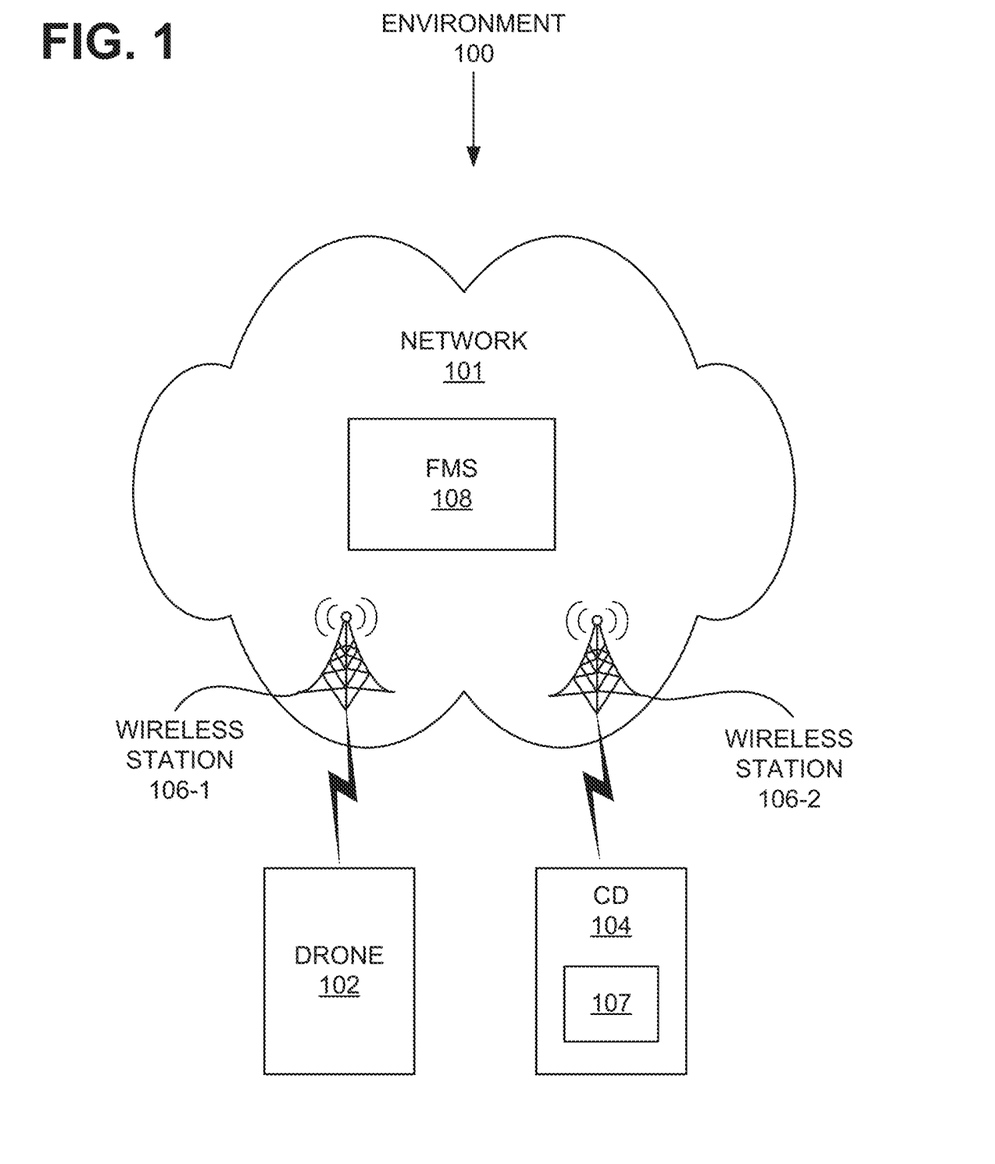
FIG. 1 illustrates an example environment in which systems and methods described herein may be implemented.

FIG. 1 illustrates an environment 100 in which the system (also referred to as a Flight Management System (FMS)) described herein may be implemented. As shown, environment 100 may include a network 101, a drone 102, and a communication device (CD) 104. Network 101 may include a local area network (LAN), a wide area network (WAN), a metropolitan area network (MAN), an optical network, a cable network, a satellite network, a wireless network (e.g., a Code Division Multiple Access (CDMA) network, a general packet radio service (GPRS) network, a Long-Term Evolution network (e.g., a Fourth Generation (4G) network), a Next Generation (NG) (e.g., a Fifth Generation (5G)) network, an ad hoc network, a telephone network (e.g., the Public Switched Telephone Network (PSTN), an intranet, or a combination of networks. Network 101 may allow the delivery of Internet Protocol (IP) services to drone 102 and communication device 104 and may interface with other networks.

Network 101 may permit drone 102 and communication device 104 to communicate with one another. To do so, network 101 may establish and maintain over-the-air channels with drone 102 and communication device 104 and maintain backhaul channels with other components (e.g., core network components) within network 101. Network 101 may convey information through these and other channels to drone 102 and communication device 104.

For wireless communications, network 101 may include many wireless stations, which are illustrated in FIG. 1 as wireless stations 106-1 and 106-2. In FIG. 1, wireless stations 106-1 and 106-2 are shown as maintaining over-the-air channels with drone 102 and communication device 104.

Depending on the implementation, wireless stations 106 may include a 4G, 5G, or another type of wireless station (e.g., eNB, gNB, etc.) that includes one or more radio frequency (RF) transceivers. Wireless stations 106 may include hardware and software to support one or more of the following: carrier aggregation functions; advanced or massive multiple-input and multiple-output (MIMO) antenna functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of Long Term Evolution (LTE)-Advanced (LTE-A) and/or 5G-related functions. In some implementations, wireless stations 106 may be part of an evolved UMTS Terrestrial Network (eUTRAN).

As further shown in FIG. 1, network 101 may include FMS 108. FMS 108 may route messages between drone 102 and communication device 104. Through FMS 108, communication device 104 can send commands to drone 102 for navigation and/or to receive signals/data from drone 102. In some implementations, FMS 108 may send commands to radio access networks in which wireless stations 106 are situated, for reconfiguring wireless stations 106 for optimum drone communications. Particular functions of FMS 108 may include, for example, authenticating drone 102 and/or communication device 104 or the user at communication device 104, routing telemetry data from drone 102 to a particular communication device 104, session management, sending flight commands from communication device 104 to drone 102, and/or forwarding other data from drone 102 (e.g., a video feed) to communication device 104. FMS 108 is described in greater detail below with reference to FIG. 2.

Drone 102 may include an aircraft (e.g., a single rotor aircraft, a multirotor aircraft, or a fixed wing aircraft) that may be controlled by another device (e.g., a ground control station (GCS) (not shown)). For example, the rotational speed of each rotor for a multirotor drone 102 may be adjusted individually via signals from the control device to maneuver drone 102 based on the particular flight goals. Depending on the context, the term "drone" as used herein may refer to the aircraft or both the aircraft and the control device.

When drone 102 is operating in network environment 100, drone 102 may register itself with FMS 108 in network 101. In addition, drone 102 may register a particular flight with FMS 108. Once drone 102 and/or a flight is registered, drone 102 may send telemetry information to FMS 108 in network 101. FMS 108 may then forward the telemetry information to communication device 104. Drone 102 may also send other information (e.g., a video feed), either along with or apart from telemetry information. After the flight is complete, drone 102 may deregister from FMS 108. In other implementations, another device rather than drone 102 may perform flight registration/deregistration for drone 102.

Communication device 104 may communicate with drone 102. Communications device 104 may include an application 107 that may be used to manage the operation of one or more drones 102. For example, application 107 may include capabilities to receive telemetry information, process the telemetry information, store the telemetry information, display representations of the telemetry information, and the like. In some implementations, application 107 may implement a control facility that allows a user to send control commands to drones 102. When used as a control device for drone 102, communication device 104 may do so in real-time and may use data/signals from drone 102 to aid in navigating drone 102. The signals/data from drone 102 may include telemetry information via FMS 108. The telemetry information may be used, for example, to detect potential collisions with another object (e.g., another drone 102) and to chart and record the precise flight path of drone 102. Telemetry information may also be used to aid a drone pilot in real-time navigation of drone 102, for example, in situations where the drone operator is allowed to operate drone 102 remotely, without being required to maintain the line-of-sight to drone 102. In such situations, the pilot may use telemetry information, as well as visual information (e.g., video feed from drone 102). For example, in some implementations, application 107 may use the telemetry information to calculate its near-term paths for drone 102. A human pilot may use the calculated near-term paths to direct drone 102 toward or along the original flight plan.

In some implementations, communication device 104 may operate as a flight management device/terminal. In these implementations, an application 107 of communication device 104 may receive flight plans from a drone operator (also referred to as a user) or via remote Application Programming Interface (API) calls from another system. To input a flight plan at communication device 104, for example, a drone operator may launch a management application 107 installed on device 104 that presents the user with a GUI for receiving information needed for planning a drone flight (e.g., a time of the flight, an identifier associated with a drone, a customer ID, a launch point of drone 102, etc.), a charted flight path, etc. After receipt of the information, the application 107 may create a database entry (e.g., in a cloud or at communication device 104) corresponding to the flight plan. A drone operator, a program, or yet another authorized person may retrieve the plan and/or information describing the planned flight path.

For clarity, FIG. 1 does not show all components that may be included in environment 100 (e.g., routers, bridges, wireless access point, additional networks, additional drones 102, communication devices 104, etc.). That is, depending on the implementation, environment 100 may include additional, fewer, different, or a different arrangement of components than those illustrated in FIG. 1.

Figure 2:
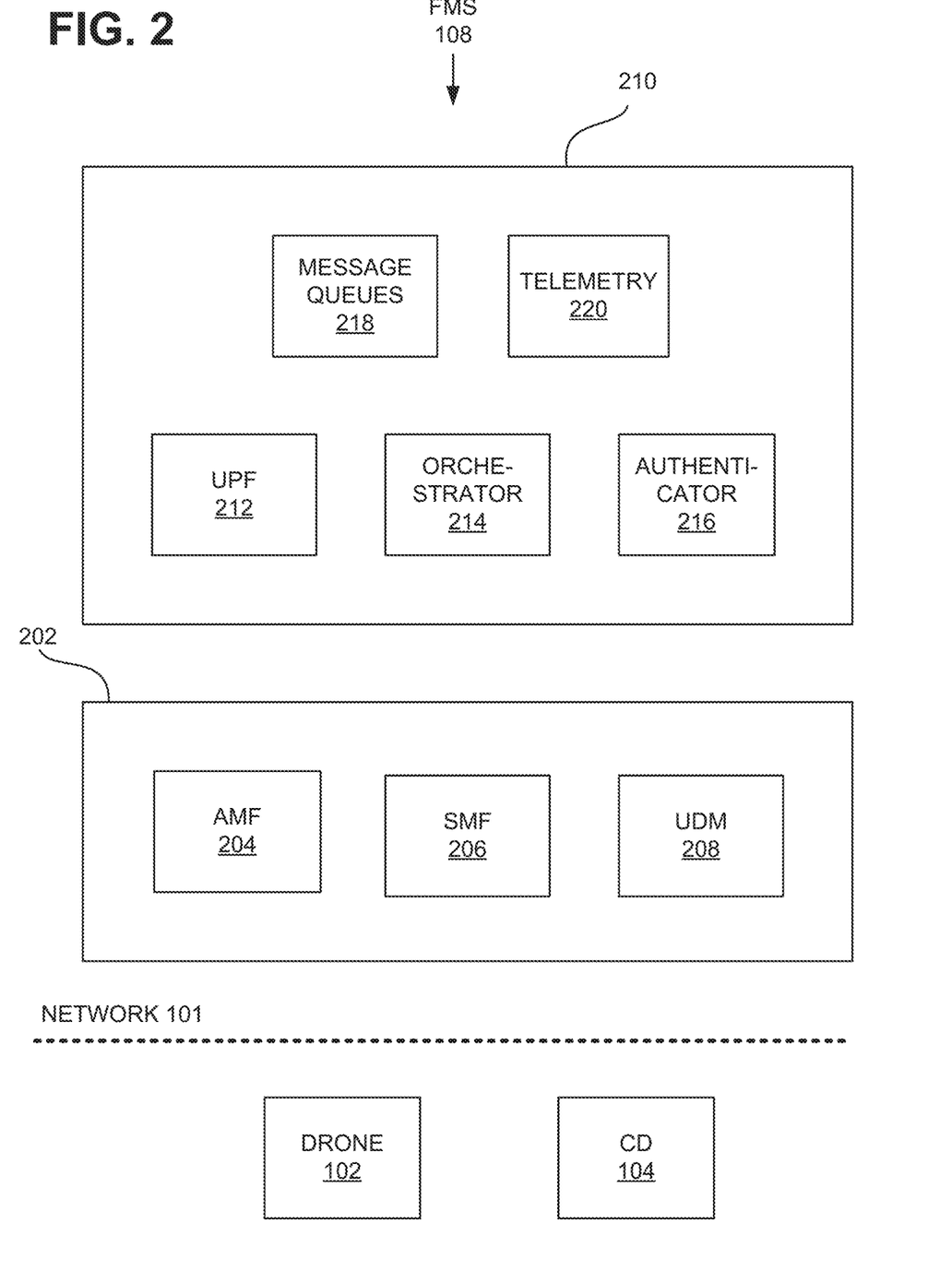
FIG. 2 depicts example components of a flight management system (FMS) according to an embodiment.

FIG. 2 depicts example components of FMS 108 according to an implementation. As shown, FMS 108 may include core network components 202 and drone service components 210. Depending on the embodiment, drone service components 210 may rely on network-provided components, which may include core network components 202, to varying degrees. For the embodiment illustrated in FIG. 2, drone service components 210 may not use all functionalities of core network components 202.

As shown, core network components 202 may include core network components of network 101. In FIG. 2, core network components 202 are shown as 5G core network components and may include one or more instances of an Access and Mobility Management function (AMF) 204, a Session Management Function (SMF) 206, a Unified Data Management function (UDM) 208. For simplicity, AMF instance 204, SMF instance 206, and UDM instance 208 are referred to herein as AMF 204, SMF 206, and UDM 208. Although core network components 202 may include other 5G core network components, for clarity they are not illustrated in FIG. 2. Furthermore, in other embodiments, core network components 202 may include other types of core network components, such as Evolved Packet Core (EPC) components for LTE networks.

AMF 204 may perform one or more of registration management, connection management, reachability management, mobility management, lawful intercepts, Short Message Service (SMS) transport between a user equipment (UE) device (e.g., drone 102, communication device 104, etc.) and an SMS function (not shown in FIG. 2), session management message transport between a UE device and SMF 206, access authentication and authorization, location services management, support of non-3GPP access networks, and/or other types of management processes. AMF 204 may page a UE device based on mobility category information associated with the UE device obtained from UDM 208. In some implementations, AMF 204 may implement some or all of the functionality of managing RAN slices in wireless stations 106.

SMF 206 may perform one or more of: session establishment, modification and/or release; IP address allocation and management; Dynamic Host Configuration Protocol (DHCP) functions; selection and control of a User Plane Function (UPF) 212; configure traffic steering at UPF 212 to guide traffic to the correct destination; terminate interfaces toward a Policy Control Function (PCF); lawful intercepts; charge data collection; support charging interfaces; control and coordinate charging data collection; terminate session management parts of Non-Access Stratum (NAS) messages; downlink data notification; manage roaming functionality; and/or perform other types of control plane processes for managing user plane data.

UDM 208 may perform one or more of: maintain subscription information for UE devices; manage subscriptions; generate authentication credentials; handle user identification; access authorization based on subscription data; network function registration management; maintain service and/or session continuity by maintaining assignment of SMF 206 for ongoing sessions; support SMS delivery; support lawful intercept functionality; and/or perform other processes associated with managing user data. For example, UDM 208 may store subscription profiles that include authentication, access, and/or authorization information.

Each subscription profile may include: information identifying UE devices; authentication and/or authorization information for UE devices; information identifying services enabled and/or authorized for UE devices; device group membership information for UE devices; and/or other types of information associated with UE devices. Furthermore, the subscription profile may include mobility category information associated with UE devices.

Drone service components 210 may include network components that are implemented on a data network or a network slice. A network slice is created when network 101 performs network slicing, which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice may be configured to meet a different set of requirements and be associated with a particular Quality of Service (QoS) class, a type of service, and/or a particular group of enterprise customers associated with mobile communication devices and/or fixed wireless access (FWA) devices.

As shown in FIG. 2, drone service components 210 may include one or more instances of: a User Plane Function (UPF) 212, an orchestrator 214, an authenticator 216, message queues 218, and a telemetry unit 220. Depending on the implementation, drone service components 210 may include additional, fewer, or different components than those illustrated. For example, in embodiments where drone service components 210 rely heavily on core network components 202 for authenticating drone 102 and communication device 102, drone service components 210 may not include a separate authenticator 216, but rather authenticator 216 may be implemented using one or more core network components 202 (e.g., UDM 208), such as described below.

UPF 212 may perform one or more of: maintaining an anchor point for intra/inter-Radio Access Technology (RAT) mobility (e.g., mobility across different radio access technologies); maintain an external Packet Data Unit (PDU) point of interconnect to a data network (e.g., an IP network, etc.); packet routing and forwarding; performing the user plane part of policy rule enforcement; packet inspection; lawful intercept; traffic usage reporting; Quality-of-Service (QoS) handling in the user plane; uplink traffic verification; transport level packet marking; downlink packet buffering; send and forward an "end marker" to a RAN node (e.g., wireless stations 106); and/or perform other types of user plane processes. Within the data network/network slice on which drone service components 210 are implemented, UPF 212 may operate as a gateway to the data network/network slice.

Orchestrator 214 may set up or tear down a framework for rendering particular services for drone 102 and communication device 104. For example, orchestrator 214 may register drone 102 when drone 102 sends a registration request to orchestrator 214 or when communication device 104 sends a registration request to orchestrator 214 to register drone 102. The request may include different information depending on whether the request is for a previously unregistered drone 102 or to re-register drone 102.

If the request is for a previously unregistered drone 102, the request may include a serial number or other identifier associated with drone 102 and credentials for a user or an organization associated with drone 102. Orchestrator 214 may request authenticator 216 to validate the credentials. If the credentials are valid, orchestrator 214 may create, in its memory or in a database, an entry (herein referred to as airframe) that represents drone 102. Thereafter, orchestrator 214 may generate an identifier such as a Universally Unique ID (UUID) for the airframe, an identifier (e.g., a UUID) for the user/organization, and an access token for drone 102. Orchestrator 214 may forward the generated identifiers and the access token to drone 102 or to the user/organization, at communication device 104, that requested the registration.

If the request is for a drone 102 that has registered previously, the request may include an identifier of the airframe for drone 102 and the user/organization credentials. If authenticator 216 is able to validate the identity of the user/organization, orchestrator 214 may indicate in the airframe, which is identified by the airframe identifier provided by the registrant, that drone 102 is active/registered. Orchestrator 214 may forward the identifier of the airframe and the identifier of the user/organization to the registrant (e.g., drone 102 or communication device 104).

Orchestrator 214 may also receive a registration request for individual drone flights for drone 102. A flight registration request may include the access token obtained from the drone registration, a payload type (for messages to be sent by drone 102), and parameters associated with the payload type. Examples of payload types include: a canonical payload, aggregated events (e.g., a collection of telemetry measurements), and flight log entries. A message that includes a canonical payload may be referred to herein as a canonical message.

Upon receipt of the request for flight registration, orchestrator 214 may invoke authenticator 216 to determine if the access token refers to an actual identifier of the airframe for drone 102. If the access token is valid (i.e., the authentication is successful), orchestrator 214 may create, in message queues 218, a particular drone queue for drone 102. Orchestrator 214 may return the name of the drone queue and a Universal Resource Identifier (URI) for the messaging system, so that drone 102 can send messages to the drone queue. When a flight is complete or when drone 102 wants to cancel a flight, drone 102 and/or communication device 104 may send a deregistration request to orchestrator 214. When orchestrator 214 receives a deregistration request from drone 102 or a user/organization, orchestrator 214 may remove the drone queue allocated for the flight from message queues 218.

In some embodiments, orchestrator 214 may provide session management functions. In other embodiments, orchestrator 214 may rely on a separate session management module or program to be notified of the beginning or the end of a session. The session management system may be implemented as part of core components 202 (e.g., using SMF 206 and UPF 212). In such implementations, the session management system may provide an endpoint for messages to arrive, from drone 102 and/or communication device 104 via SMF 206 and UPF 212. Depending on the implementation, orchestrator 214 may perform management of different types of queues in message queues 218. Some of these functions are described below with reference to FIG. 3.

Authenticator 216 may perform authentication of drones 102 and communication devices 104. When drone 102 is registering with orchestrator 214, orchestrator 214 may forward user/organization credentials to authenticator 216 to authenticate the user/organization. Depending on the implementation, authenticator 216 may perform a more specialized authentications, via components herein referred to as airframe authenticator and a queue authenticator. Orchestrator 214 may invoke the airframe authenticator during the initial or subsequent registration of drone 102 and invoke the queue authenticator to permit drone 102 or communication device 104 to access one or more of the queues in messaging queue 218.

Depending on the implementation, authenticator 216 may use UDM 208 to store or access various parameters that are associated with drone 102, such as access token, various identifiers, etc. In these implementations, authenticator 216 may access UDM 208 to retrieve such values for validation. Other aspects of authentication may be performed by AMF 204, UDM 208, and an Authentication Server Function (AUSF) (not shown in FIG. 2).

Figure 3:
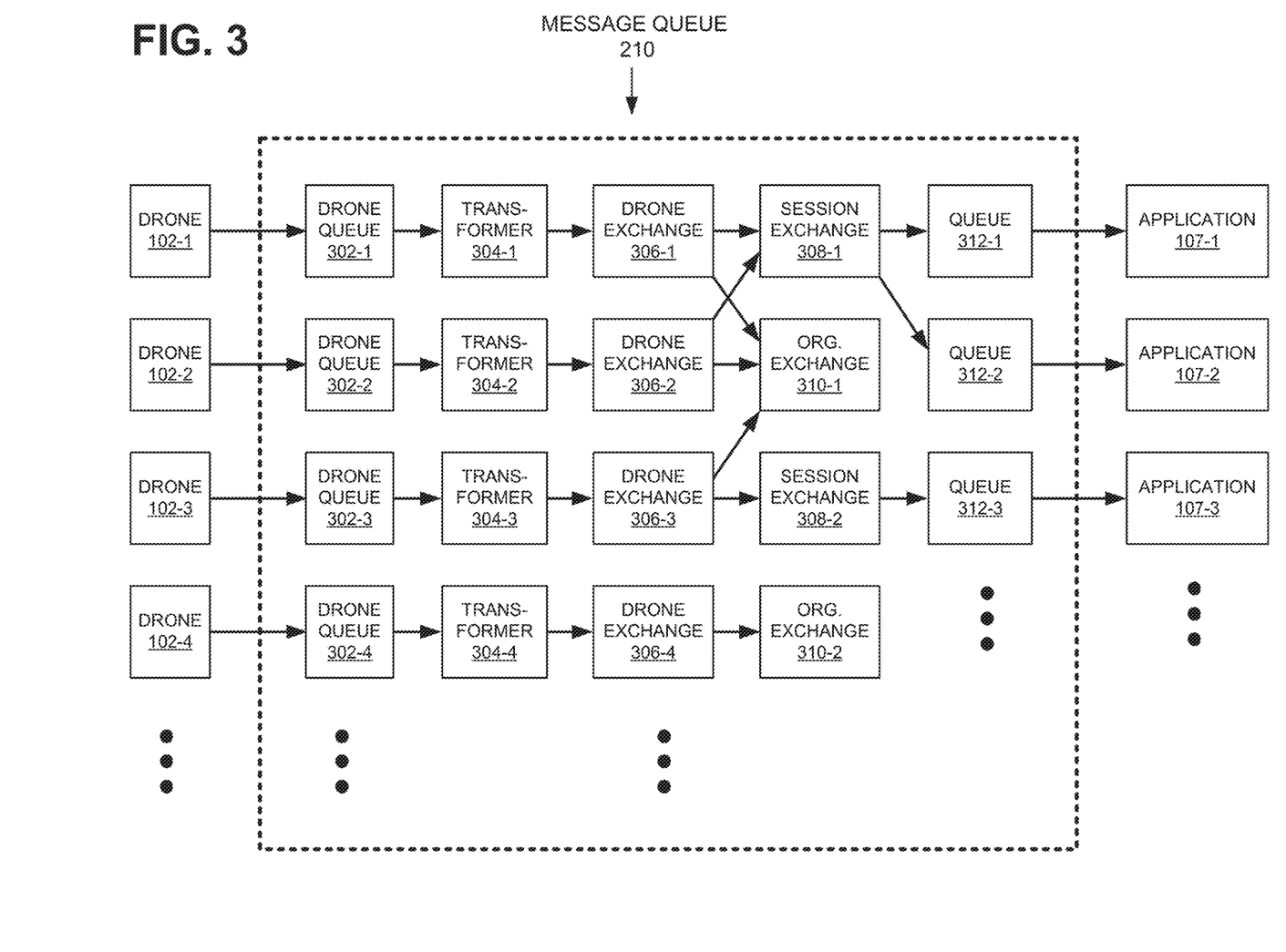
FIG. 3 illustrates example components of message queues according to an implementation.

Message queues 218 are used to relay telemetry data from drones 102 to communication device 104. Message queues 218 may include various queues for holding messages from drones 102, communication device 104, and/or from other nodes (including other queues). In addition, message queues 218 may include components for processing the messages. Each queue may hold messages until they are forwarded to another queue or to another network node. FIG. 3 illustrates example components of message queues 218 according to an implementation. As shown, message queues 218 include: drone queues 302-1 through 302-N (Nth queue not shown), transformers 304-1 through 304-N (Nth transformer not shown), drone exchanges 306-1 thorough 306-N (Nth exchange not shown), session exchanges 308, organization exchanges 310, and ephemeral queues 312. Depending on the implementation, message queues 218 may include additional, fewer, different, or a different arrangement of various types of queues and processing components.

Drone queues 302 receive messages from drones 102. Each drone queue 302 represents an entry point for the messages from a particular drone 102 into queues 218. Each drone queue 302 is created by orchestrator 214 when drone 102 or communication device 104 registers a drone flight with orchestrator 214. As indicated above, the address of drone queue 302 is forwarded to the registrant upon registration. Similarly, drone queue 302 is removed by orchestrator 214 when the flight ends or when drone 102 or communication device 104 deregisters the flight. When drone queue 302 receives messages from the corresponding drone 302, drone queue 302 transmits the messages to a respective transformer 304 associated with the drone queue 302.

Transformer 304 may process messages in drone queues. For example, transformer 304 may receive as input a message of one format and output a message of another format, such as a "canonical format," to be described below. When drone 102 is registered with orchestrator 214, orchestrator 214 may instantiate a transformer 304 corresponding to the drone 102 and configure the transformer 304 in the manner particular to the drone 102. Accordingly, each transformer 304 may process messages specifically for the corresponding drone queue 302. In one implementation, when transformer 304 processes a message in drone queue 302, transformer 304 may convert a payload of a message of one type to another type and transfer the processed message into the corresponding drone exchange 306. For example, transformer 304 may convert a payload of one type into a canonical payload. A canonical payload complies with internal content and/or formatting requirements of FMS 108 for use (e.g., includes velocity data, location data, data representing a state of the drone 102, etc.) and provides a complete view of each event (i.e., a set of measurements for drone 102, including telemetry data and drone state data, captured at a given moment). In addition, a canonical payload provisions for the age of data elements. An example of a canonical format is described below and in connection with FIG. 4. Other payload types that may be included in messages from drone 102 may include a flight log and an event group (e.g., a group of successive drone events).

Drone exchange 306 includes a queue for temporarily queuing messages with canonical payloads. Each canonical message may remain in drone exchange 306 until transferred to further downstream elements as may be determined based on how the message queues 218 have been configured. For example, the message may be transferred to a session exchange 308, which is a queue corresponding to an endpoint with which drone 102 engages in a session. Session exchange 308 may receive messages from different drones 102 each engaged in a session with the same endpoint. Each session exchange 308 is created by orchestrator 214 when drone 102 begins a session with FMS 108 (e.g., with an endpoint within FMS 108) and may be removed when the session terminates. Orchestrator 214 may provision the drone exchange 306 to transmit messages to the corresponding session exchange 308 associated with the session or, in some embodiments, may instruct drone exchange 308 to transmit messages to the corresponding session exchange 308.

Drone exchanges 306 may hold messages that are transmitted to an organization exchange 310, which is a queue that corresponds to an organization to which the end user (e.g., a user of application 107) belongs. Each organization exchange 310 may hold all messages that originate from different drones 102 for the organization corresponding to the exchange 310. Each organizational exchange 310 may be created by orchestrator 214 when a drone 102 associated with an organization begins a session with FMS 108 and/or when a user associated with an organization makes a request to receive telemetry data from drone 102. Orchestrator 214 may provision the drone exchange 306 to transmit messages to the organization exchange 310 for the organization associated with drone 102 or, in some embodiments, may itself transfer messages om drone exchange 306 to the organization exchange 310 for the organization associated with drone 102.

An ephemeral queue 312 (also referred to as a temporary queue 312) is created by telemetry service 220 when telemetry service 220 decides, in response to a request for telemetry service from application 107, to provide the telemetry service to the application 107. As explained below, in the request for telemetry service, application 107 may specify from which drones, sessions, and/or organization the application 107 wishes to obtain the telemetry data. Telemetry service 220 then locates the corresponding drone exchanges 306, session exchanges 308, and/or organization exchanges 310. Telemetry service 220 subscribes the ephemeral queue 312 (for the application 107) to the drone exchanges 306, session exchanges 308, and/or organization exchanges 310, by associating the ephemeral queue 312 with the drone exchanges 306, session exchanges 308, and/or organization exchanges 310. Thereafter, ephemeral queue 312 may receive messages from the exchanges to which the ephemeral queue 312 is subscribed. In some implementations, Orchestrator 214 or telemetry service 220 may perform (or instruct the performance of) the actual transport of the messages from the exchanges to the ephemeral queue 312, based on the association that telemetry service 220 made when it subscribed the ephemeral queue 312 to the exchanges.

Returning to FIG. 2, telemetry service 220 (also referred to as telemetry messaging service) exposes telemetry data from drones to applications 107. To subscribe to telemetry service 220, an application 107 may send a telemetry service request that includes: an organization identifier and, optionally, session identifiers and airframe identifiers. Upon receipt of the request, telemetry service 220 invokes authenticator 216 to validate the application 107 (or the user associated with the application 107 making the request). If the application 107 (or application user) is successfully authenticated, telemetry service 220 creates an ephemeral queue 312 corresponding to the application 107. When telemetry service 220 creates an ephemeral queue 312, telemetry service 220 associates the network address of the requesting application 107 with the ephemeral queue.

As indicated above, the ephemeral queue 312 is subscribed to the exchanges from which it is to receive messages, to provide the messages to the application 107 corresponding to the ephemeral queue 312. After the creation of ephemeral queue 312 and its subscription to appropriate exchanges, telemetry service 220 provides the application 107 requesting the telemetry service with the address (e.g., URL or URI) at which application 107 is to access the telemetry data. Thereafter, ephemeral queue 312 receives processed telemetry messages that originated from drones 102 through various exchanges. Depending on the implementation, application 107 may access ephemeral queue 312 to pick up the telemetry messages; or alternatively, telemetry service 220 may deliver the messages from ephemeral queue 312 to application 107, by forwarding the messages to the network address, of application 107, that was associated with ephemeral queue 31. In either case, the accessed/delivered telemetry data are removed from ephemeral queue 312.

When application 107 subscribes to telemetry service 220, telemetry service 220 may accept information pertaining to a "bounding region" from application 107. The bounding region information specifies spatial coordinates of an area for which application 107 wishes to receive the telemetry data. For example, application 107 may not want telemetry data from a drone 102 when drone 102 is outside the bounding region around a building. Telemetry service 220 may filter messages based on the bounding region information (e.g., remove telemetry data from drones 102 outside the bounding region) and deliver the filtered messages to application 107. Depending on the implementation, telemetry service 220 may throttle delivery of the messages to application 107.

Figure 4:
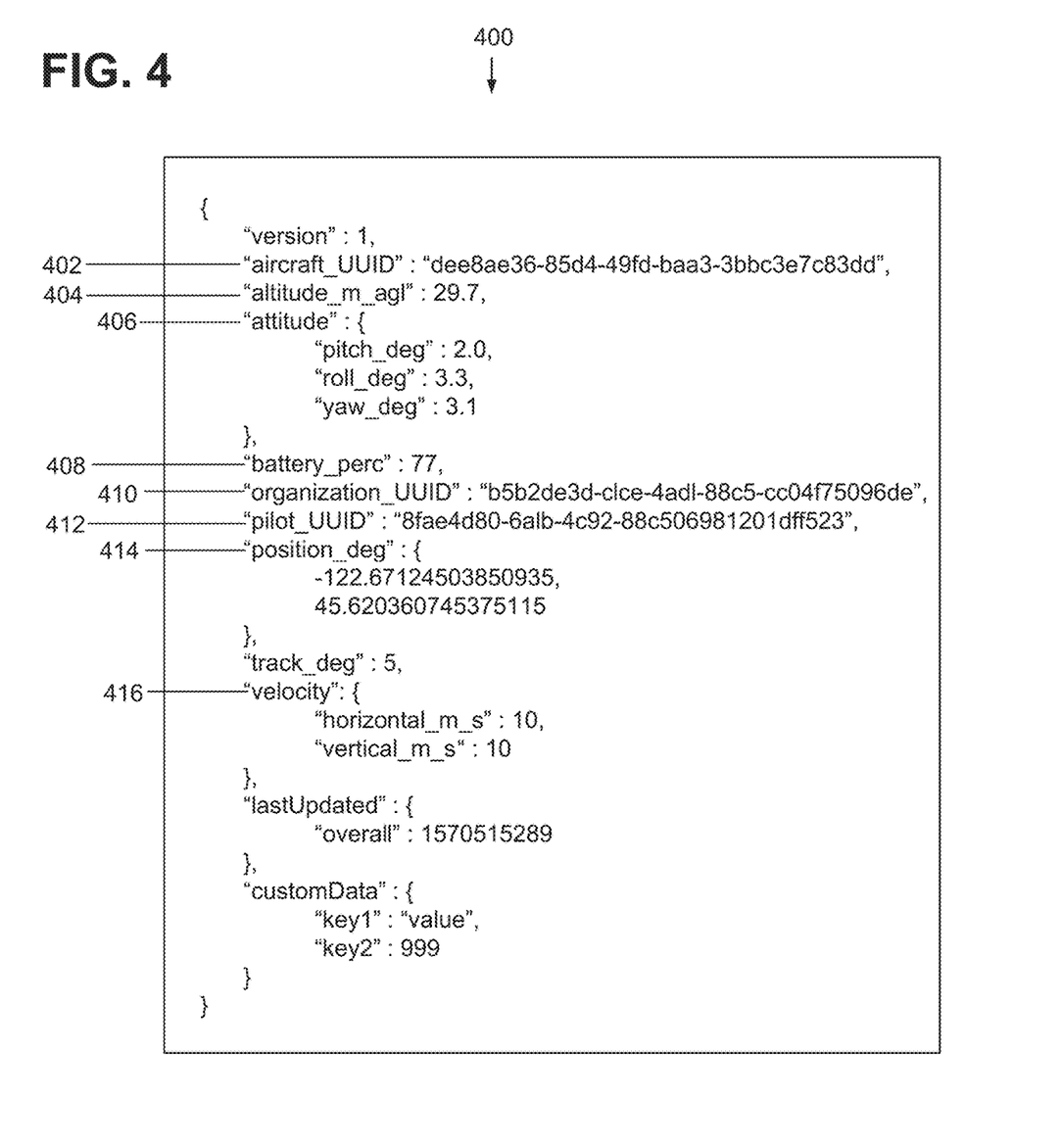
FIG. 4 shows an example canonical message that may be placed in a drone exchange according to an implementation.

FIG. 4 shows an example canonical message 400 that may be placed in a drone exchange 306 according to an implementation. Canonical message 400 may have been generated by transformer 304 after processing a telemetry message in a drone queue 302. In some implementations, canonical message 400 may include attribute-value pairs (AVPs) such as ones provided in JavaScript Object Notation (JSON) format. Some of the AVPs are shown in FIG. 4 as aircraft UUID AVP 402, an altitude AVP 404, attitude AVPs 406, a battery AVP 408, an organization UUID AVP 410, a pilot UUID AVP 412, a position AVPs 414, and velocity AVPs 416. In other implementations, canonical message 400 may include additional, fewer, different, or differently arranged/formatted data components than those illustrated in FIG. 4.

Aircraft UUID AVP 402 may indicate an identifier for drone 102 which sent the message. Altitude AVP 404 may indicate, in meters, the altitude of drone 102 above the ground level. Attitude AVP 406 may indicate the orientation of drone 102. The attitude AVP includes values for a yaw, a pitch, and a roll in degrees. Battery AVP 408 is one of AVPs that indicate various states of drone 102 and indicates the level of battery power available to drone 102, as a percentage of its maximum battery power. For example, in FIG. 4, battery AVP 408 is at 77%.

Organization UUID AVP 410 and pilot UUID AVP 412 indicate the identifier of the organization associated with drone 102 and the pilot for drone 102, respectively. Position AVPs 414 provides the position of drone 102, as values in longitude and latitude. Velocity AVPs 416 provide the velocities of drone 102 in horizontal and vertical directions.

Figure 5A:
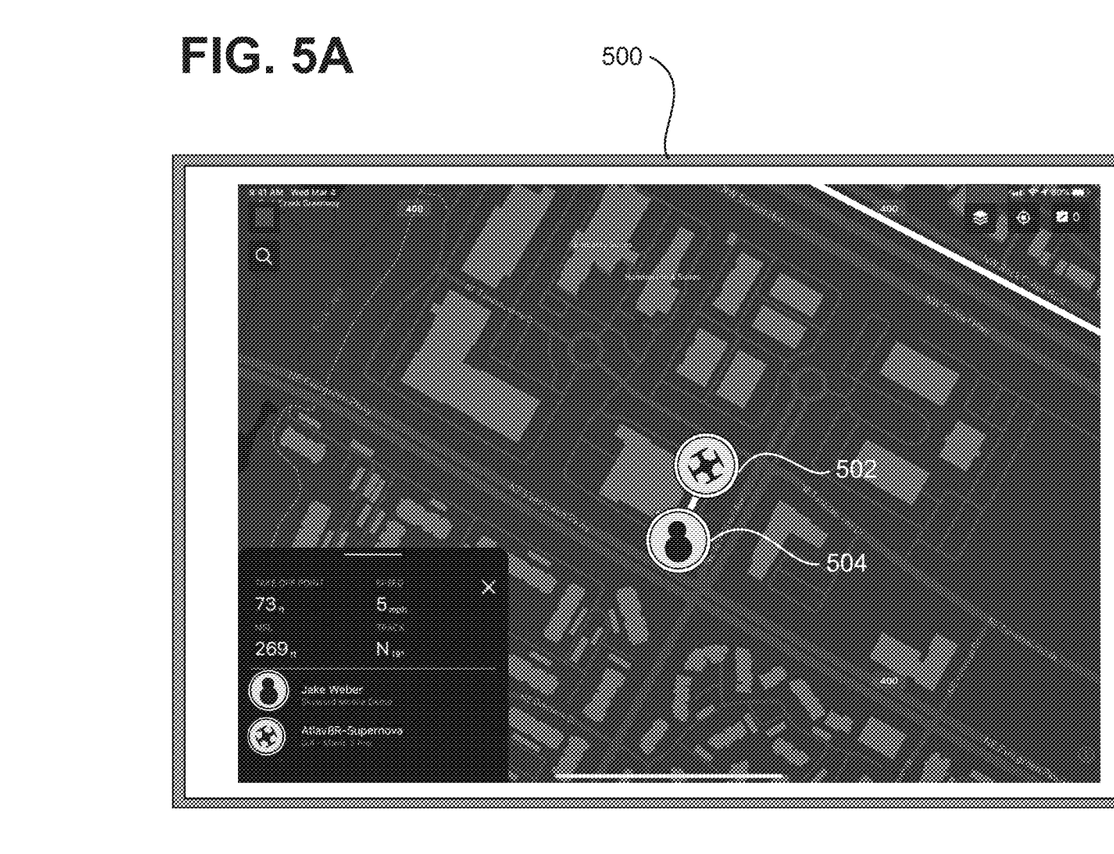
FIGS. 5A and 5B show example application windows that depict telemetry data, according to different implementations.
Figure 5B:
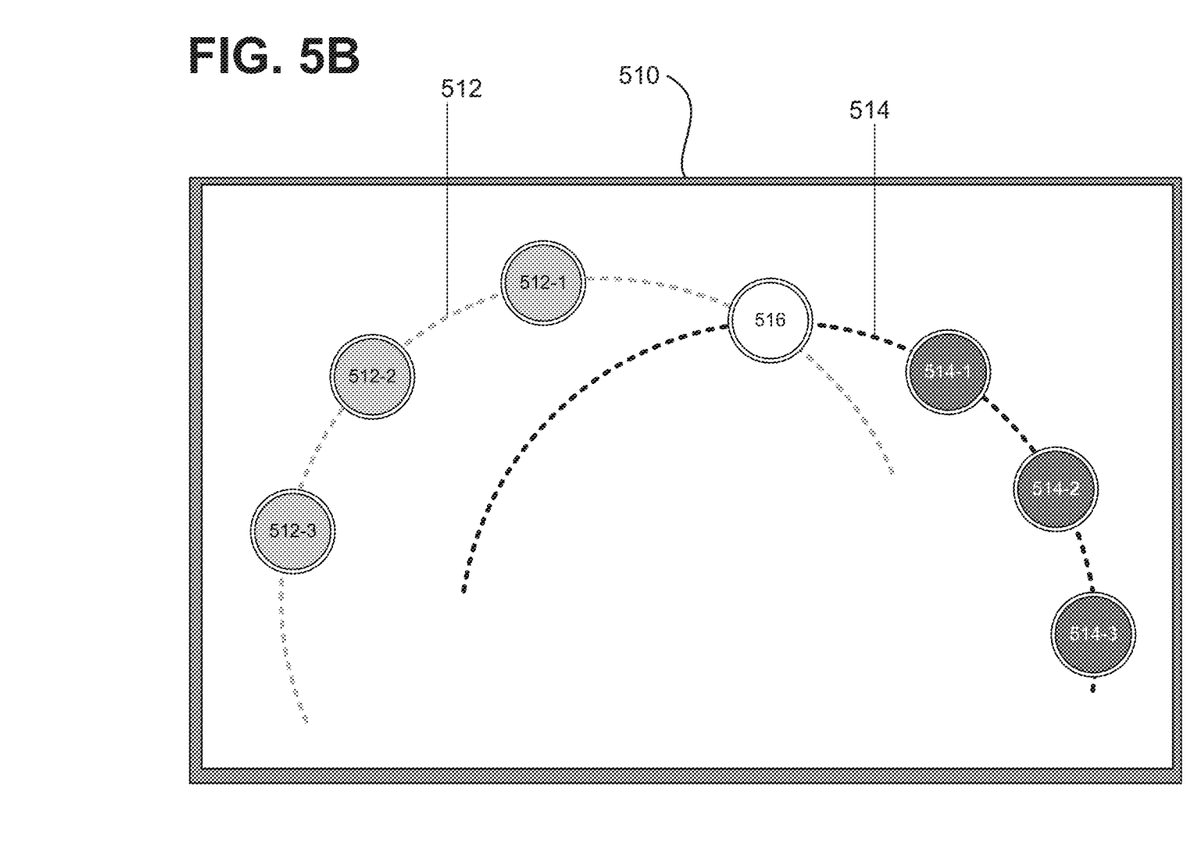

FIGS. 5A and 5B show application windows that may be generated by application 107 and depict representations of telemetry data, according to different implementations. FIG. 5A illustrates an example user interface that shows the location of drone 102 and its pilot within an application window 500. In window 500, drone icon 502 and pilot icon 504 are overlayed against a map backdrop, at locations reflected by telemetry data that application 107 accessed from ephemeral queue 312.

FIG. 5B illustrates an example user interface that shows trajectories of multiple drones 102. After application 107 obtains telemetry data from its ephemeral queue 312, for two drones 102 that application 107 tracks, application 107 may render trajectory 512 and trajectory 514 in window 510. For trajectory 512, application 107 plots two prior positions of the first drone 102 (positions 512-3 and 512-2) and the current position of the drone 102 (position 512-1). Similarly, application plots prior positions of the second drone 102 (positions 514-3 and 514-2) and the current position of the drone 102 (position 514-1). Furthermore, application 107 shows the projected location of the first and second drones, as position/location 516. As shown, the position/location 516 indicates a danger zone, in which the first and second drone 102 may collide. Position 516 for the first drone and the second drone may be estimated partly based on, for example, the velocity vectors (each velocity vector has 3 components (e.g., a velocity along X-axis, a velocity along Y-axis, and a velocity along Z-axis)) and the coordinates of respective drones 102. The projected distance between the first and second drone may be calculated using, for example, the Haversine formula. In some implementations, the trajectories may be shown overlaid over a map backdrop.

Figure 6:
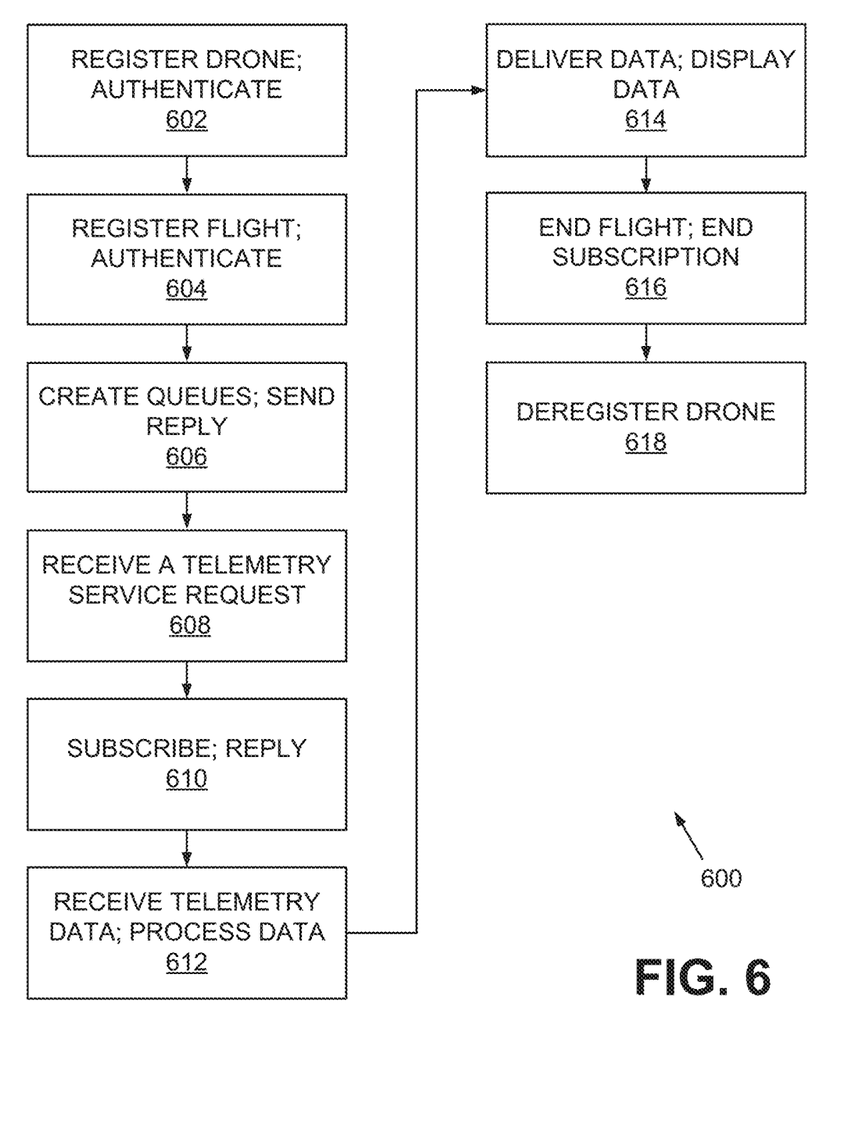
FIG. 6 is a flow diagram of an example process that is associated with conveying telemetry data from a drone to an application.

FIG. 6 is a flow diagram of an example process 600 that is associated with conveying telemetry data from drone 102 to application 107. Process 600 may be performed by various devices and network components illustrated in FIGS. 1-3, such as for example, drone 102, communication device 104, core components 202 (e.g., AMF 204, SMF 306, UDM 208, etc.), drone service components 210 (e.g., UPF 212, orchestrator 214, etc.).

As shown, process 600 may include registering drone 102 at FMS 108 (block 602). As discussed above, depending on the implementation, FMS 108 may receive a request to register drone 102 using communication device 104. In some embodiments, drone 102 may be programmed to send a request to register itself with FMS 108. To register, drone 102 or communication device 104 may send a serial number of the drone 102 to FMS 108 (e.g., orchestrator 214) and credentials for a user or an organization associated with drone 102. Upon receipt of the request, orchestrator 214 may authenticate the user or the organization associated with drone 102 using the credentials. If the authentication is successful, FMS 108 may allocate an airframe for drone 102, obtain an identifier (e.g., a UUID) for the airframe, create an access token associated with drone 102, and forward the access token and the airframe identifier to the registrant.

Alternatively, if drone 102 already has been registered previously, the request may include an identifier of the airframe associated with the drone 102 and the credentials. Upon receipt of the request, FMS 108 may authenticate the user/organization associated with drone 102. In a different implementation, the authentication may be performed by core network components 202, such as AMF 204, UDM 208, and/or an AUSF. Core network components 202 may forward the result of the authentication to orchestrator 214. Orchestrator 214 may send the access token for the drone 102 and various identifiers to the registrant.

Process 600 may further include registering a flight for the registered drone 102 (block 604). Communication device 104, for example, may send a request for flight registration to FMS 108. The request for flight registration may include the access token for the drone 102, a payload type (for messages to be sent by drone 102), and parameters associated with the payload type. Upon receipt of the access token, either the core network components 202 or orchestrator 214 may match (e.g., using authenticator 216) an identifier referred to by the access token to the identifier of the airframe for the drone 102. If the identifiers match, FMS 108 may create, in message queues 218, a particular drone queue for drone 102 (block 606). For example, orchestrator 214 may also create a drone queue 302, transformer 304 and drone exchanger 306, and may configure the transformer 304 to translate telemetry messages from drone 102 (e.g., from the native format of the drone 102 into a canonical format, such as an example shown in FIG. 4). Orchestrator 214 may return the name of the drone queue and a URI for the messaging system to drone 102.

Process 600 may further include FMS 108 receiving a subscription request for the telemetry service (block 608). For example, telemetry service 220 may receive a subscription request for the drone flight from an application 107 on communication device 104 (which, in some situations, may not necessarily be the same communication device 104 that registered the drone or drone flights) to allow the application 107 executing on the communications device 104 to receive telemetry information. The request may include a user and/or an organization credentials (e.g., an identifier for the user and/or organization). Optionally, the request may also include session identifier (e.g., to access particular sessions with drones 102), and/or airframe identifiers. Upon receipt of the request, telemetry service 220 invokes authenticator 216 to validate the application 107 (or the user associated with the application 107 making the request).

If the application 107 (or application user) is successfully authenticated, telemetry service 220 creates an ephemeral queue 312 corresponding to the application 107 in message queues 218. As indicated above, the ephemeral queue 312 would be configured to receive messages from only those queues in message queues 218 to meet the requirements specified by the application 107 (e.g., the specific sessions or organization-related messages to which application 107 wants to listen for messages). After the creation of the ephemeral queue 312, the application 107 (or application user) is subscribed to the telemetry service (block 610) and telemetry service 220 forwards the address of the ephemeral queue 312 to application 107 (block 610), along with other URIs/URLs needed by application 107 to locate the ephemeral queue 312.

Depending on the implementation, the request for subscription to the telemetry service may include information pertaining to a bounding region for application 107. The bounding region information specifies spatial coordinates of an area for which application 107 wishes to receive the telemetry data. For example, application 107 may not want telemetry data from a drone 102 when drone 102 is outside the bounding region, and accordingly, application 107 may forward the bounding region information in the subscription request.

Process 600 may include FMS 108 receiving telemetry data/messages from one or more drones 102 (block 612). Each message may be forwarded to the corresponding drone queue 302. For example, each drone may use the URI for the drone queue 302 to which it was assigned to send messages including telemetry information. As telemetry data/messages accumulate in drone queues 302, transformers 304 may process the messages/data (block 614) and place the processed data in the corresponding drone exchanges 306 in message queues 218. In one implementation, each transformer 304 may convert the received messages into canonical messages (such as the example described above with reference to FIG. 4). Orchestrator 214 further routes the processed messages from drone exchanges 306 to organization queues 308 and session queues 310, In processing the messages, orchestrator 214 ensures that a message is not removed from a particular queue, until all the recipient queues have a copy of the message. Thereafter, orchestrator 214 feeds ephemeral queue 312 corresponding to the application 107 with message from session exchanges 308 and organization exchanges 310 to which the ephemeral queue 312 is subscribed.

Once messages arrive in ephemeral queue 312, depending on the implementation, application 107 may access ephemeral queue 312 to pick up the telemetry messages; or alternatively, telemetry service 220 may deliver the messages from ephemeral queue 312 to application 107 (block 614). In either case, the accessed/delivered telemetry messages are removed from ephemeral queue 312. The data that telemetry service 220 accesses for delivery to application 107 are filtered by telemetry service 220, for example, based on application requirements, such as the bounding region associated with application 107. For example, telemetry service 220 would filter out telemetry messages from a drone 102 whose position would be mapped to a location outside the bounding region of the application 107 and delivered the remaining messages to the application 107.

When the application 107 receives or accesses the telemetry data, application 107 may generate a display based on the data (block 614). Depending on the implementation and the application settings, application 107 may display drones 102 in various formats. For example, application 107 may display the data as illustrated in FIG. 5A or in FIG. 5B. The application 107 may display multiple drones, their coordinates, their trajectories, etc.

Process 600 may further include ending the drone flight (block 616) and/or ending the telemetry service subscription (block 616). If a flight is terminated, orchestrator 214 may deregister the flight. Applications 107 subscribed to receive telemetry information for the drone whose flight has been terminated would no longer receive data from the drone 102—although such applications 107 may continue to receive data from other drones 102 that are still in operation. If the subscription to the telemetry service is terminated, telemetry service 220 may remove the ephemeral queue 312 corresponding to the application 107. Queues that have been feeding the ephemeral queue 312, are not necessarily removed, however, since they may be feeding other ephemeral queues 312 associated with other applications 107.

After the flight, if a particular drone 102 becomes inactive, the drone 102 may be deregistered (block 618). For example, drone 102 and/or communications device 104 may request deregistration (such as when a drone has completed a flight). In some implementations, registration information may be associated with a time-to-live value which allows registration information to be removed (e.g., by orchestrator 214) from the database after a period of time. Depending on the implementation, the registration information (e.g., the airframe) may or may not be removed from databases in FMS 108. For example, if the registration information is not removed from the database, the deregistered drone 102 may be able to re-register with FMS 108 using the existing registration information assigned to it.

Figure 7:
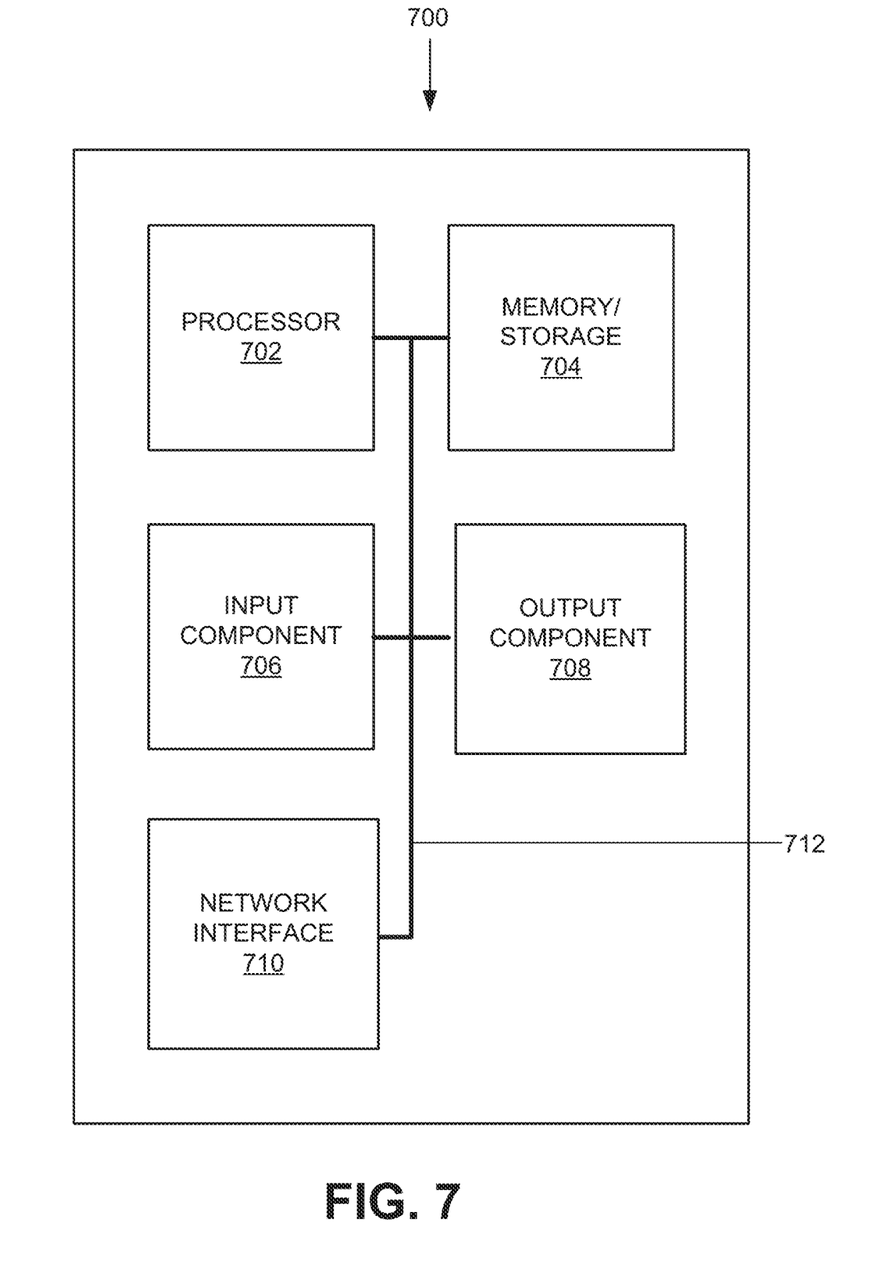
FIG. 7 shows example components of an example network device.

FIG. 7 depicts an example network device 700. Network device 700 corresponds to or is included in drone 102, communication device 104, and/or any of the network components of FIG. 1 (e.g., a router, a network switch, servers, gateways, etc.). As shown, network device 700 includes a processor 702, memory/storage 704, input component 706, output component 708, network interface 710, and communication path 712. In different implementations, network device 700 may include additional, fewer, different, or a different arrangement of components than the ones illustrated in FIG. 7. For example, network device 700 may include a display, network card, etc.

Processor 702 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 700 and/or executing programs/instructions.

Memory/storage 704 may include static memory, such as read only memory (ROM), and/or dynamic memory, such as random access memory (RAM), or onboard cache, for storing data and machine-readable instructions (e.g., programs, scripts, etc.).

Memory/storage 704 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 704 may be external to and/or removable from network device 700. Memory/storage 704 may include, for example, a Universal Serial Bus (USB) memory stick, a dongle, a hard disk, off-line storage, a Blu-Ray® disk (BD), etc. Memory/storage 704 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 706 and output component 708 may provide input and output from/to a user to/from device 700. Input and output components 706 and 708 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 700.

Network interface 710 may include a transceiver (e.g., a transmitter and a receiver) for network device 700 to communicate with other devices and/or systems. For example, via network interface 710, network device 700 may communicate with a ground control station, or with devices over a network.

Network interface 710 may include an Ethernet interface to a LAN, and/or an interface/connection for connecting device 700 to other devices (e.g., a Bluetooth interface). For example, network interface 710 may include a wireless modem for modulation and demodulation.

Communication path 712 may enable components of network device 700 to communicate with one another.

Network device 700 may perform the operations described herein in response to processor 702 executing software instructions stored in a non-transient computer-readable medium, such as memory/storage 704. The software instructions may be read into memory/storage 704 from another computer-readable medium or from another device via network interface 710. The software instructions stored in memory or storage (e.g., memory/storage 704, when executed by processor 702, may cause processor 702 to perform processes that are described herein. For example, application 107 program may be executed by processor 702 of communication device 104, to illustrate various telemetry information or to render other images (e.g., maps).

In this specification, various preferred embodiments have been described with reference to the accompanying drawings. It will be evident that modifications may be made thereto, and additional embodiments may be implemented, without departing from the broader scope of the invention as set forth in the claims that follow. The specification and drawings are accordingly to be regarded in an illustrative rather than restrictive sense.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Further, certain portions of the implementations have been described as "logic" that performs one or more functions. This logic may include hardware, such as a processor, a microprocessor, an application specific integrated circuit, or a field programmable gate array, software, or a combination of hardware and software.

In the above, while a series of blocks have been described with regard to the processes illustrated in FIG. 6, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device comprising:
a processor configured to execute instructions to:
receive a request, from an application running on a device for managing drones, to subscribe to a telemetry messaging service, which forwards telemetry messages from the drones to subscribed applications, that is provided by the network device;
grant a subscription to the telemetry messaging service, to the application based on the request;
receive telemetry messages from the drones over a radio access network (RAN);
process the telemetry messages; and
provide the processed telemetry messages to the application over the RAN.

2. The network device of claim 1, wherein when the processor grants the subscription, the processor is configured to:
send, to the application, a Universal Resource Identifier (URI) and a queue name from which the application can receive the telemetry messages.

3. The network device of claim 1, wherein the request to subscribe includes bounding box information, wherein the bounding box information identifies drones from which the application is to receives telemetry messages, and wherein the bounding box information identifies the drones by specifying a geographical area in which the drones must be located.

4. The network device of claim 1, wherein the application is configured to:
within a window of the application and based on the telemetry messages, show a location where two drones are likely to collide based on trajectories of the two drones.

5. The network device of claim 1, wherein the processor is further configured to:
receive a request to register a drone from a first device, wherein the request to register the drone includes:
a first identifier associated with the drone; and
a second identifier associated with a user of the drone, and wherein the processor is further configured to:
create an entry, in a database, that represents the drone;
generate a Universally Unique Identifier (UUID) for the entry in the database; and
transmit an access token over the RAN to the first device in response to the request to register the drone.

6. The network device of claim 5, wherein the processor is further configured to:
receive a request to register a flight associated with the drone from a second device, wherein the request to register the flight includes the access token.

7. The network device of claim 6, wherein when the processor receives the request to register the flight, the processor is configured to:
determine, using the access token, the UUID of the entry in the database; and
associate the entry with the flight.

8. The network device of claim 1, wherein the network device further comprises a memory, and wherein when the processor grants the subscription, the processor is configured to:
create, in the memory, a temporary queue from which the application is to either receive or collect the processed telemetry messages.

9. The network device of claim 1, wherein the network device is included in hardware from which the telemetry messaging service is provided to the application, and the hardware includes a network slice.

10. A method comprising:
receiving a request, by a network device, from an application running on a device for managing drones, to subscribe to a telemetry messaging service, which forwards telemetry messages from the drones to subscribed applications, that is provided by the network device;
granting a subscription to the telemetry messaging service, to the application based on the request;
receiving telemetry messages from the drones over a radio access network (RAN);
processing the telemetry messages; and
providing the processed telemetry messages to the application over the RAN.

11. The method of claim 10, wherein granting the subscription includes:
sending, to the application, a Universal Resource Identifier (URI) and a queue name from which the application can receive the telemetry messages.

12. The method of claim 10, wherein the request to subscribe includes bounding box information, wherein the bounding box information identifies drones from which the application is to receives telemetry messages, and wherein the bounding box information identifies the drones by specifying a geographical area in which the drones must be located.

13. The method of claim 10, wherein the application is configured to:
within a window of the application and based on the telemetry messages, show a location where two drones are likely to collide based on trajectories of the two drones.

14. The method of claim 10, further comprising:
receiving a request to register a drone from a first device, wherein the request to register the drone includes:
a first identifier associated with the drone; and
a second identifier associated with a user of the drone, and wherein the method further includes:
creating an entry, in a database, that represents the drone;
generating a Universally Unique Identifier (UUID) for the entry in the database; and
transmitting an access token over the RAN to the first device in response to the request to register the drone.

15. The method of claim 14, wherein further comprising:
receiving a request to register a flight associated with the drone from a second device, wherein the request to register the flight includes the access token.

16. The method of claim 15, wherein receiving the request to register the flight includes:
determining, using the access token, the UUID of the entry in the database; and
associate the entry with the flight.

17. The method of claim 10, wherein granting the subscription further comprises:
creating, in a memory, a temporary queue from which the application is to either receive or collect the processed telemetry messages.

18. The method of claim 10, wherein the network device is included in hardware from which the telemetry messaging service is provided to the application, and the hardware includes a network slice.

19. A non-transitory computer-readable medium, comprising computer-executable instructions, when executed by a processor, cause the processor to:
receive a request, at a network device, from an application running on a device for managing drones, to subscribe to a telemetry messaging service, which forwards telemetry messages from the drones to subscribed applications, that is provided by the network device;
grant a subscription to the telemetry messaging service, to the application based on the request;
receive telemetry messages from drones over a radio access network (RAN);
process the telemetry messages; and
provide the processed telemetry messages to the application over the RAN.

20. The non-transitory computer-readable medium of claim 19, wherein when the processor grants the subscription, the processor is configured to:
send, to the application, a Universal Resource Identifier (URI) and a queue name from which the application can receive the telemetry messages.

* * * * *